US011372733B2

(12) United States Patent
Salins et al.

(10) Patent No.: US 11,372,733 B2
(45) Date of Patent: Jun. 28, 2022

(54) MOUNT AND MIGRATE

(71) Applicant: Google LLC, Mountain View, CA (US)

(72) Inventors: Michael Harold Salins, Aurora, IL (US); Durgesh Kumar Verma, Hyderabad (IN)

(73) Assignee: Google LLC, Mountain View, CA (US)

( * ) Notice: Subject to any disclaimer, the term of this patent is extended or adjusted under 35 U.S.C. 154(b) by 152 days.

(21) Appl. No.: 16/812,064

(22) Filed: Mar. 6, 2020

(65) Prior Publication Data
US 2021/0279147 A1 Sep. 9, 2021

(51) Int. Cl.
*G06F 11/14* (2006.01)
*G06F 16/21* (2019.01)

(52) U.S. Cl.
CPC ...... *G06F 11/1469* (2013.01); *G06F 11/1464* (2013.01); *G06F 16/214* (2019.01)

(58) Field of Classification Search
CPC . G06F 11/1469; G06F 16/214; G06F 11/1464
USPC ......................................................... 707/682
See application file for complete search history.

(56) References Cited

U.S. PATENT DOCUMENTS

| 10,649,952 | B1* | 5/2020 | Chakankar | G06F 3/067 |
|---|---|---|---|---|
| 10,909,143 | B1* | 2/2021 | Brahmadesam | G06F 16/2228 |
| 10,929,428 | B1* | 2/2021 | Brahmadesam | G06F 16/2379 |
| 2004/0193625 | A1* | 9/2004 | Sutoh | G06F 11/1471 |
| 2015/0019487 | A1* | 1/2015 | Buehne | G06F 16/119 |
| | | | | 707/632 |
| 2016/0077925 | A1* | 3/2016 | Tekade | G06F 11/1456 |
| | | | | 707/654 |
| 2016/0321339 | A1* | 11/2016 | Tekade | G06F 8/76 |
| 2020/0310921 | A1* | 10/2020 | Littlefield | G06F 16/176 |
| 2021/0034474 | A1* | 2/2021 | Khandkar | G06F 11/2069 |
| 2021/0240582 | A1* | 8/2021 | Khandkar | G06F 11/1451 |

* cited by examiner

*Primary Examiner* — Ashish Thomas
*Assistant Examiner* — Abdullah A Daud
(74) *Attorney, Agent, or Firm* — Honigman LLP; Brett A. Krueger; Grant Griffith

(57) ABSTRACT

Systems and methods are disclosed for migrating or restoring a server database such that the migrated server database can be used before data has copied to storage for the migrated server database. Data used by a server database is copied to a copy storage, which is mounted to a second server database. The second server database is brought online using the copy of data. The copy of data is copied to a second storage. The second server database is brought offline and switched to run from the second storage. The second server database is brought back online, thereby permitting use of the second server database before copying data to the second storage.

20 Claims, 16 Drawing Sheets

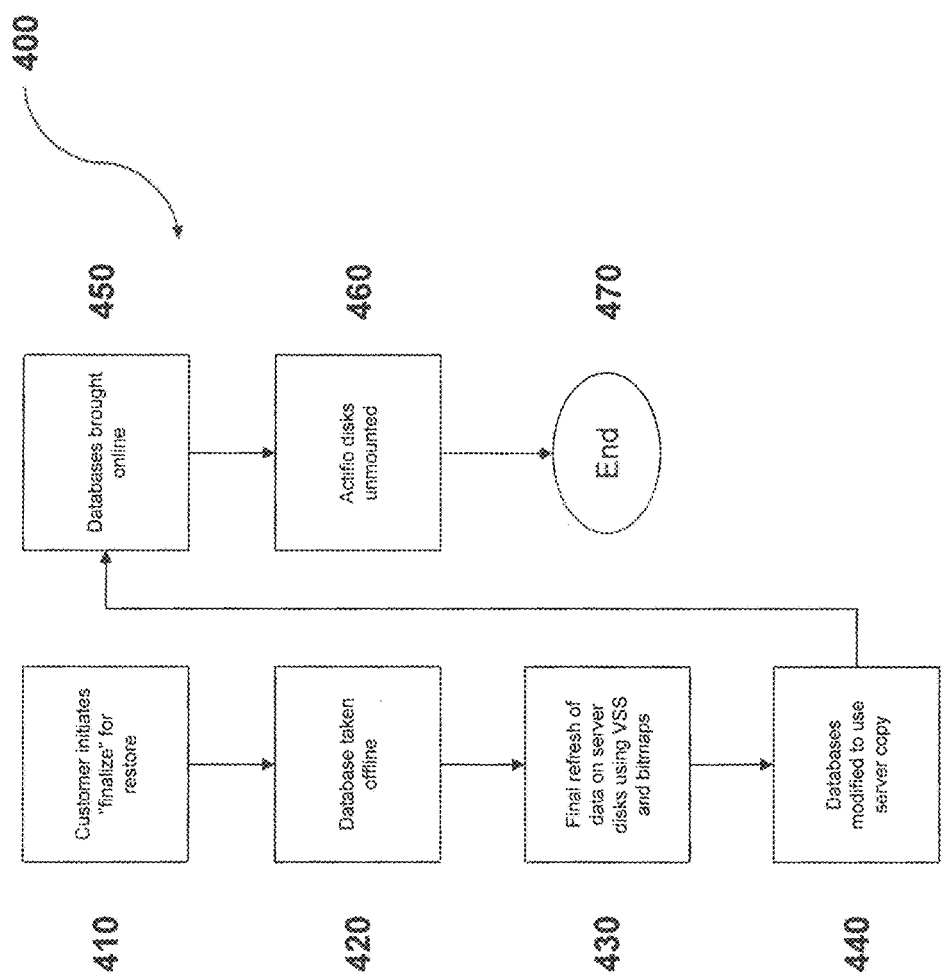

510

To specify migrate to copy the files at the same location as the production database `<restore-locations usesourcelocation="true">`

520

To specify migrate to copy the files with different target file location for each production database file `<restore-locations usesourcelocation="false"><file name="DB05_log.ldf" source="F:\Log" target="C:\Log"/><file name="DB04_log.ldf" source="F:\Log" target="G:\Log"/><file name="DB05.mdf" source="E:\Data" target="C:\Data"/><file name="DB04.mdf" source="E:\Data" target="G:\Data"/></restore-locations>`

530

To specify migrate to copy the files with different target volume for each production volume `<restore-locations usesourcelocation="false"><volume source="F:" target="C:"/><volume source="E:" target="G:"/></restore-locations>`

FIG. 5

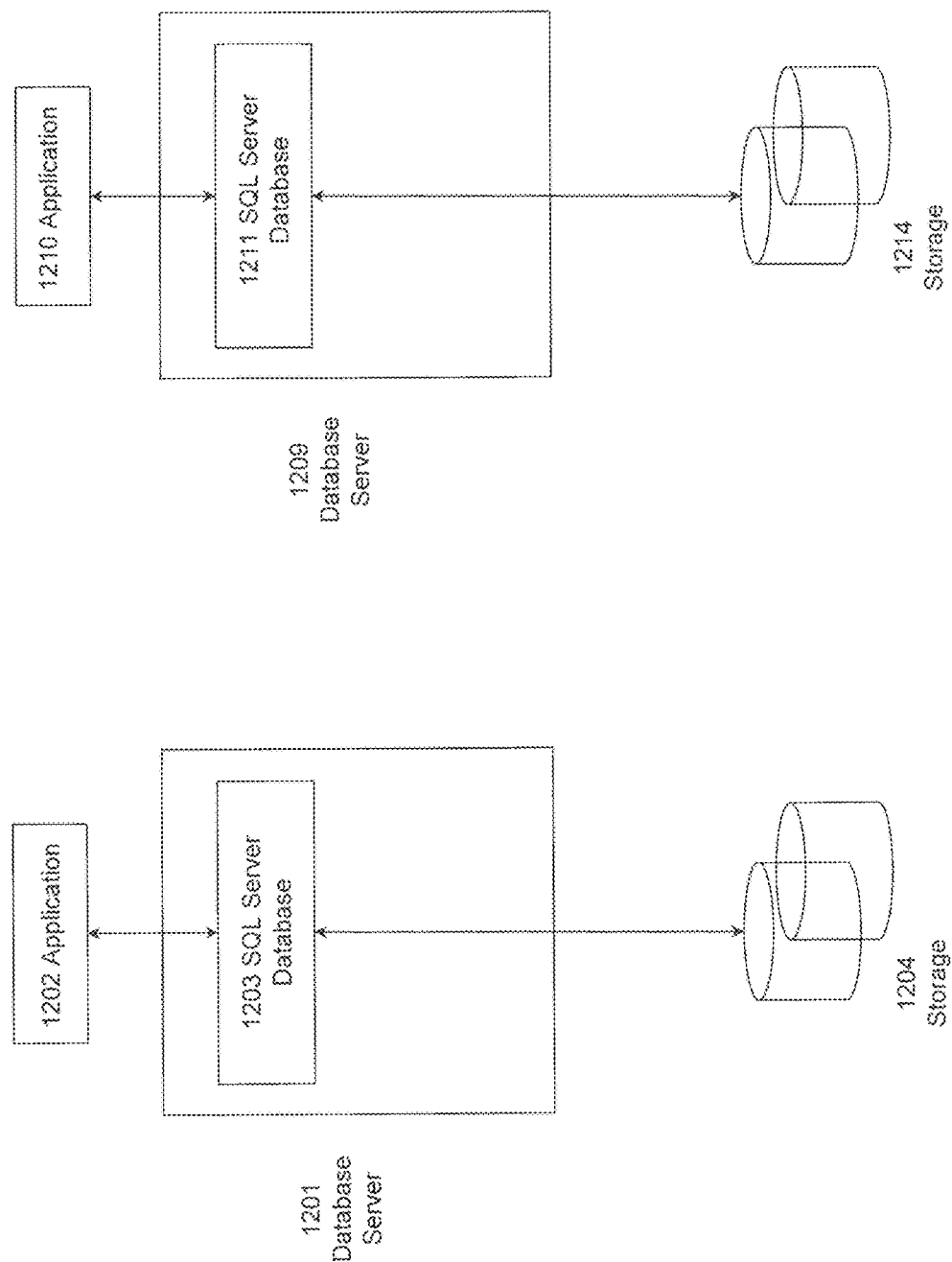

MOUNT AND MIGRATE

FIELD

The subject matter disclosed in this application generally relates to server databases, such as SQL databases, and in particular to migrating or restoring server these databases.

BACKGROUND

When a database is migrated or restored, it can only be used once the migrate or restore is complete. As shown in FIG. 12, the database data may be stored in storage 1204 that can be accessed by a database server 1201 hosting, for example, SQL server database 1203, to enable application 1202. In certain circumstances, a user may want to migrate the database to another server, such as SQL Server Database 1211 on database server 1209, or restore the SQL Server Database 1203 on server 1201. To do so, a user initiates the migrate or restore and waits for the data to migrate or restore. The user must wait for all the data to be copied before the SQL Server Database 1211 or restored SQL Server Database 1203 is brought online and can be used.

A problem arises if the user wants to use the SQL Server Database 1211, or the restored SQL Server Database 1203 before the migrate or restore is complete. According to certain embodiments, the instant application solves this problem with systems and/or methods that allow access of data before a migrate or restore is complete.

SUMMARY

According to certain embodiments, the instant application provides systems and/or methods that allow access of data by a new application before a migrate or restore is complete.

The disclosed subject matter includes a computerized method of migrating or restoring a server database such that the migrated server database can be used before data has copied to storage for the migrated server database. The method includes storing a copy of data used by a server database in a copy storage, the copy storage being different storage than a first storage used by the server database. The method includes mounting the copy of data in the copy storage to a second server database such that the second server database can use the copy of data on the copy storage. The method further includes bringing the second server database online, the second server database using the copy of data on the copy storage. The method further includes copying the copy of data to a second storage for use by the second server database; and finalizing the migrate to the second server database. Finalizing the migrate to the second server database includes switching the second server database to use the second storage, and unmounting the copy of data in the copy storage. The method thereby permits use of the second server database before copying data to the second storage.

The disclosed subject matter includes a system for migrating or restoring a server database such that the migrated server database can be used before data has copied to storage for the migrated server database. The system includes a processor and a memory coupled to the processor and including instructions that, when executed by the processor, cause the processor to store a copy of data used by a server database in a copy storage, the copy storage being different storage than a first storage used by the server database. The system processor is also caused to mount the copy of data in the copy storage to a second server database such that the second server database can use the copy of data on the copy storage. The system processor is also caused to bring the second server database online, the second server database using the copy of data on the copy storage. The system processor is also caused to copy the copy of data to a second storage for use by the second server database. The system processor is also caused to finalize the migrate to the second server database, including switch the second server database to use the second storage, and unmount the copy of data in the copy storage. The system thereby permits use of the second server database before copying data to the second storage.

The disclosed subject matter includes a non-transitory computer readable medium having executable instructions operable to cause an apparatus to store a copy of data used by a server database in a copy storage, the copy storage being different storage than a first storage used by the server database. The apparatus is also caused to mount the copy of data in the copy storage to a second server database such that the second server database can use the copy of data on the copy storage. The apparatus is also caused to bring the second server database online, the second server database using the copy of data on the copy storage. The apparatus is also caused to copy the copy of data to a second storage for use by the second server database. The apparatus is also caused to finalize the migrate to the second server database, including switch the second server database to use the second storage, and unmount the copy of data in the copy storage. The apparatus is thereby permitted to use the second server database before copying data to the second storage.

In certain embodiments, the second server database is the same as the server database. In further embodiments, the storage used by the second server database is the same as a storage used by the server database, and in other further embodiments, the storage used by the second server database is different than a storage used by the server database.

In certain embodiments, the second server database is different from the server database. In further embodiments, the storage used by the second server database is the same as a storage used by the server database, and in other further embodiments, the storage used by the second server database is different than a storage used by the server database.

In certain embodiments, switching the second server database to use the second storage includes bringing the second server database offline, refreshing the data on the storage for use by the server database, modifying the second server database to use data in the second storage, and bringing the second server database online. In further embodiments, the a transaction log is maintained including information representative of transactions on the database, and after one of the refreshing the data on the storage for use by the server database, the modifying the second server database to use data in the second storage, or the bringing the second server database online, the second database is updated based on the transaction log.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

These and other capabilities of embodiments of the disclosed subject matter will be more fully understood after a review of the following figures, detailed description, and claims. It is to be understood that both the foregoing general description and the following detailed description are explanatory only and are not restrictive of the claimed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings.

FIG. 4 illustrates a flowchart of steps to finalize a restore performed via migration according to certain embodiments;

FIG. 5 illustrates exemplary XML syntax to specify the destination for a migration according to certain embodiments;

FIG. 12 illustrates an environment applicable for mounting and migrating data according to certain embodiments.

DESCRIPTION

Figure 1A:
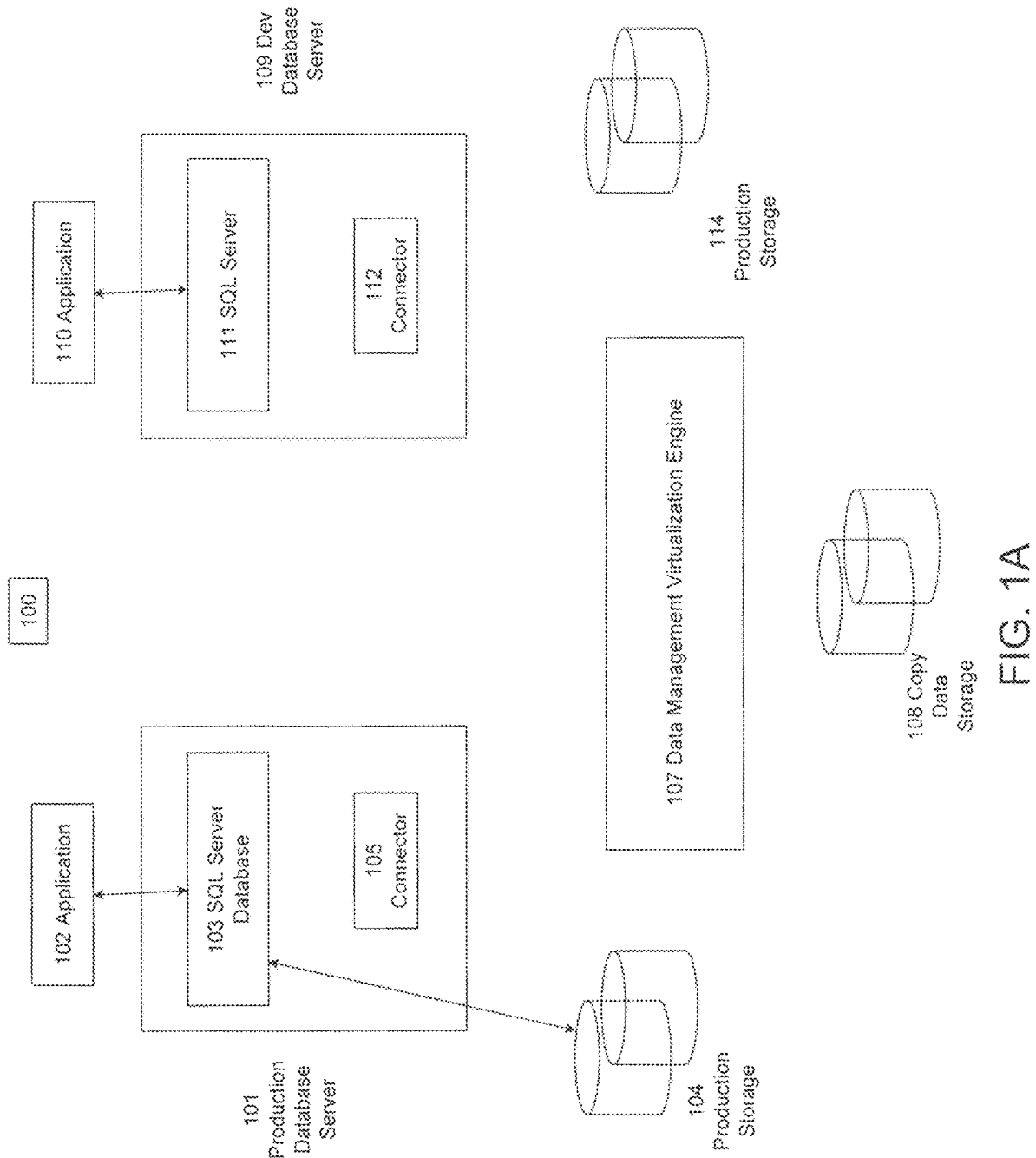
FIGS. 1A-1E illustrate a system and method of mounting and migrating data according to certain embodiments.

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

In certain embodiments, the mounting and migrating system and process described herein allows a user to copy a SQL Server database to a server and storage with minimum delay before they can use the database, thereby reducing recovery time objective (RTO). For example, in certain embodiments, a user uses the system and/or process described herein to restore a database, for example, to what it looked like before an earlier point in time. For example, a restore can be used to recover from corruption in the database or an irreversible change that was accidentally made. In other embodiments, the copying does not restore the database mount & migrate is when a user wants to copy their database, for example when copying the database to another server and storage. Mount & migrate without restoring can be useful, for example, when the user requires a long-term or permanent copy of a database for e.g., production, testing, development, QA, analytics, or other purpose as would be apparent to one skilled in the art.

While the description herein focuses on SQL server databases, one of ordinary skill would recognize that systems and methods described herein could be applied to other databases, disks, or filesystems. Nonlimiting examples of other uses include but are not limited to Oracle (for example, in non-ASM configurations), other database engines that can run on a Windows platform, and database engines or filesystem in a non-Windows, non-LVM configuration.

FIG. 1 illustrates a system 100 for migrating or restoring data according to certain embodiments. FIG. 1A illustrates the system 100 before a request to migrate or restore data. The system 100 includes production database server 101, production storage 104, application 102, data management virtualization engine 107, copy data storage 108, development ("dev") database server 109, production storage 114 and application 110. The production database server 101 includes SQL server database 103 and connector 105. Development database server 109 includes SQL server 111 and connector 112.

In certain embodiments, the system 100 is similar or analogous to the system 100 described in U.S. Pat. No. 10,282,201, which incorporated herein by reference. In certain embodiments, like numerals in the instant application correspond to like numerals in U.S. Pat. No. 10,282,201 and the description thereof.

SQL server database 103 is hosted on production database server 101. In certain embodiments, production database server 101 is used for production environments. In other embodiments, production database server 101 is used for other purposes or environments, such as development, test, quality assurance, analytics, disaster recovery, or others as would be apparent to one of skill in the art. Application 102 uses the SQL server database 103 for storing application data. The application can consume the SQL server database for various purposes using a variety of different connections, as would be apparent to one of skill in the art. The SQL server database 103 consumes data on production storage 104. In certain embodiments, the production storage 104 is connected via a block storage protocol or is locally attached storage. The production database server 101 also includes a connector 105 that can be used to interface with data management virtualization engine 107, such as to read data from or write data to copy data storage 108.

The system 100 also hosts SQL server 111 on database server 109. In certain embodiments, at this point, the development database server 109 does not yet have a database for the restore, which can be added in FIG. 1C. In certain embodiments, SQL server 111 can be used in development environments. In other embodiments, SQL server 111 can be used for purposes other than development environments, such as production, test, quality assurance, analytics, disaster recovery, or others as would be apparent to one of skill in the art. Application 110 uses the SQL server 111 for storing application data. The SQL server 111 consumes data on production storage 113. In certain embodiments, the production storage 113 is connected via a block storage protocol or is locally attached storage. The dev database server 109 also includes a connector 112 that can be used to interface with data management virtualization engine 107, such as to read data from or write data to copy data storage 108.

The system 100 also includes data management virtualization engine 107. In certain embodiments, the data management virtualization engine 107 manages the process for data capture and for mount and migrate activities. In certain embodiments, it manages the copy data storage 108 to keep track of multiple point in time images of the source database (SQL server database 103) and makes a read/write virtual version of them available when and where needed. In certain embodiments, data management virtualization engine 107 is an Actifio appliance. The data management virtualization engine 107 uses copy data storage 108 to store data. In certain embodiments, copy data storage 108 can be CDS, Sky, or CDX storage. As discussed above, the data management virtualization engine 107 interfaces with production database server 101 via connector 105, and with dev database server 109 via connector 112.

In certain embodiments, production storage 104, copy data storage 108, and production storage 113 can be different storage, provisioned on the same storage, or some combination thereof.

Figure 1B:
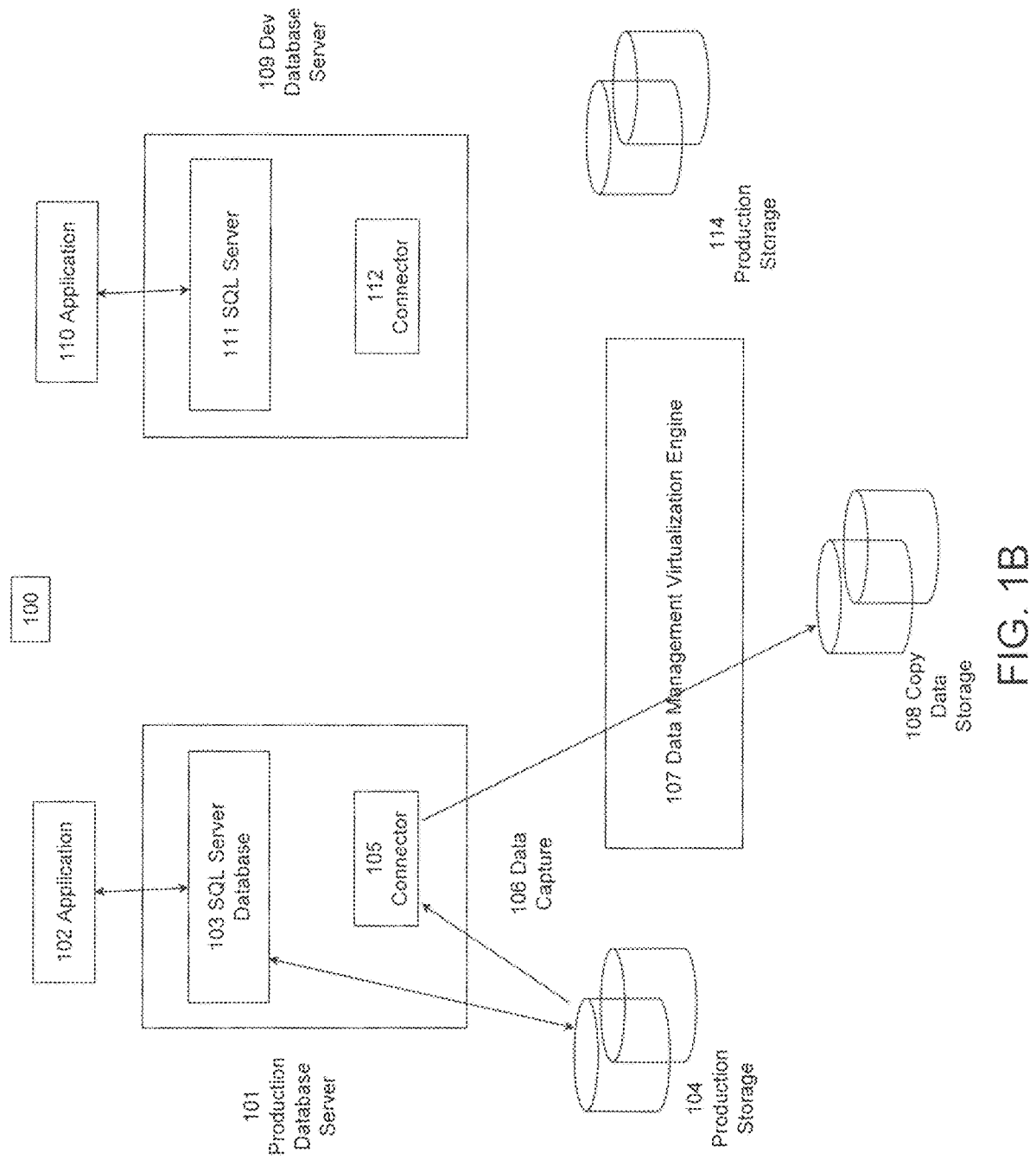

FIG. 1B illustrates an exemplary first step for migrating data or restoring data according to certain embodiments. In certain embodiments, the SQL server database 103 remains online and operational during the process. First, a user configures the Data Management Virtualization Engine 107 to capture SQL Server Database 103 from database server 101 and store it on Copy Data Storage 108. For illustration purposes, the below description focuses on a migrate from SQL Server Database 103 to database server 109. However, it should be appreciated that similar steps are taken with respect to a restore of SQL Server Database 103 on the same server and storage, as would be apparent to one of skill in the art from the descriptions herein.

Once the user configures the data capture, data management virtualization engine 107 performs a periodic and scheduled data capture 106 to capture data from production storage 104 and copies it to copy data storage 108. This is performed through connector 105. In certain embodiments this is performed as described in in U.S. Pat. No. 10,282,201.

Figure 1C:
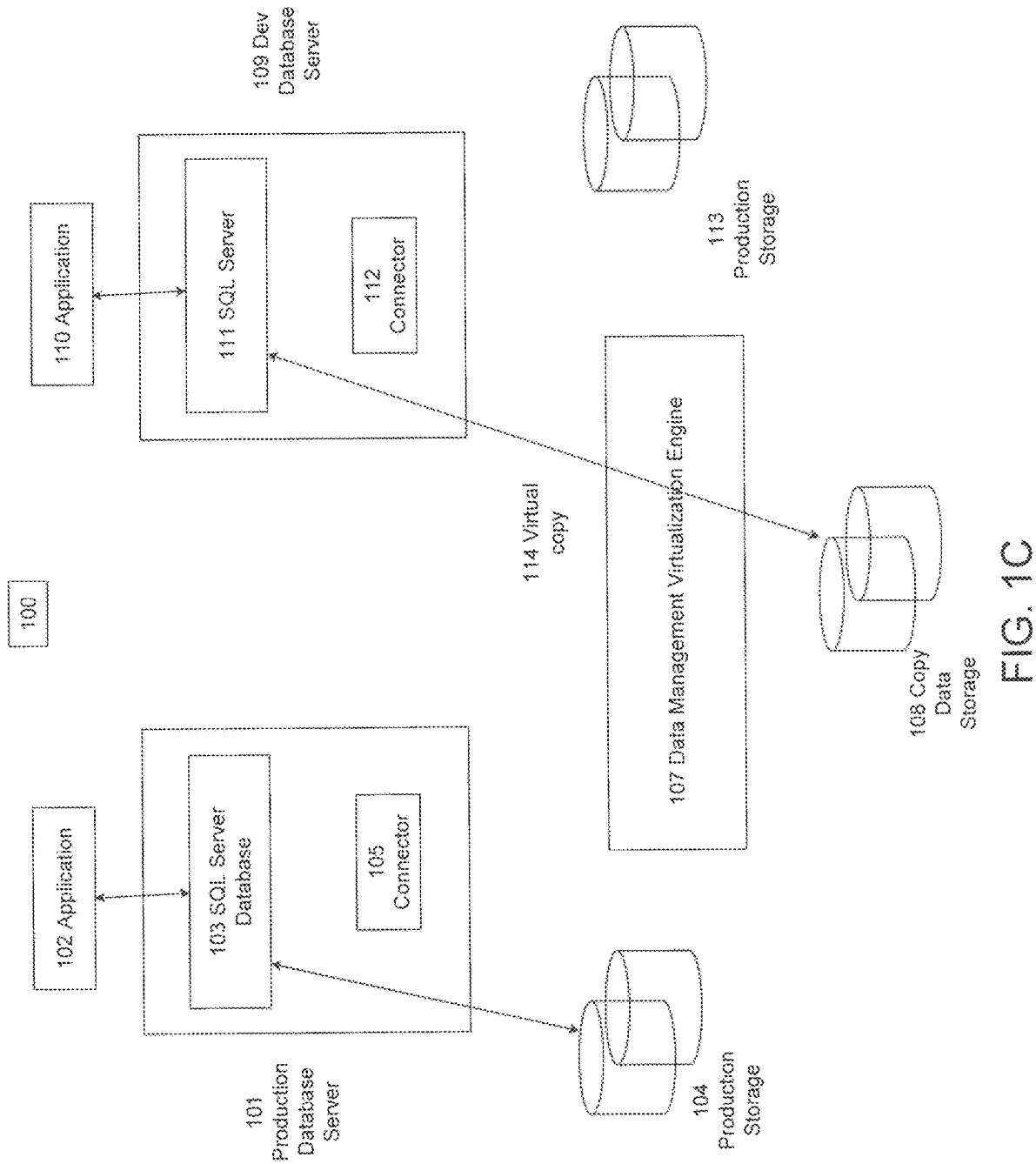

FIG. 1C illustrates an exemplary second step for migrating data according to certain embodiments. In certain embodiments, the data management virtualization engine 107 stores multiple point-in-time copies of SQL server database 103 on copy data storage 108. The user requests a mount of a point-in-time copy of SQL server database 103 to SQL server 111. Alternatively, the user requests a restore of SQL server database 103 back to the production database server 101. Data management virtualization engine 107 mounts the copy data storage 108 to SQL server 111 so that the SQL server 111 can access the data stored thereon. This permits the copy of SQL Server Database 103 to begin running before the data is copied to production storage 113. If the user requests a restore instead of a mount, then the data management virtualization engine 107 mounts the copy data storage 108 to production database Server 101 so that the SQL server can access the data stored thereon, and instructs the connector 105 to remove SQL Server Database 103 and replace it with the copy mounted from the copy data storage 108 (for example as discussed with respect to FIG. 2). This permits the copy of SQL Server Database 103 to begin running before the data is restored to production storage 104.

Figure 1D:
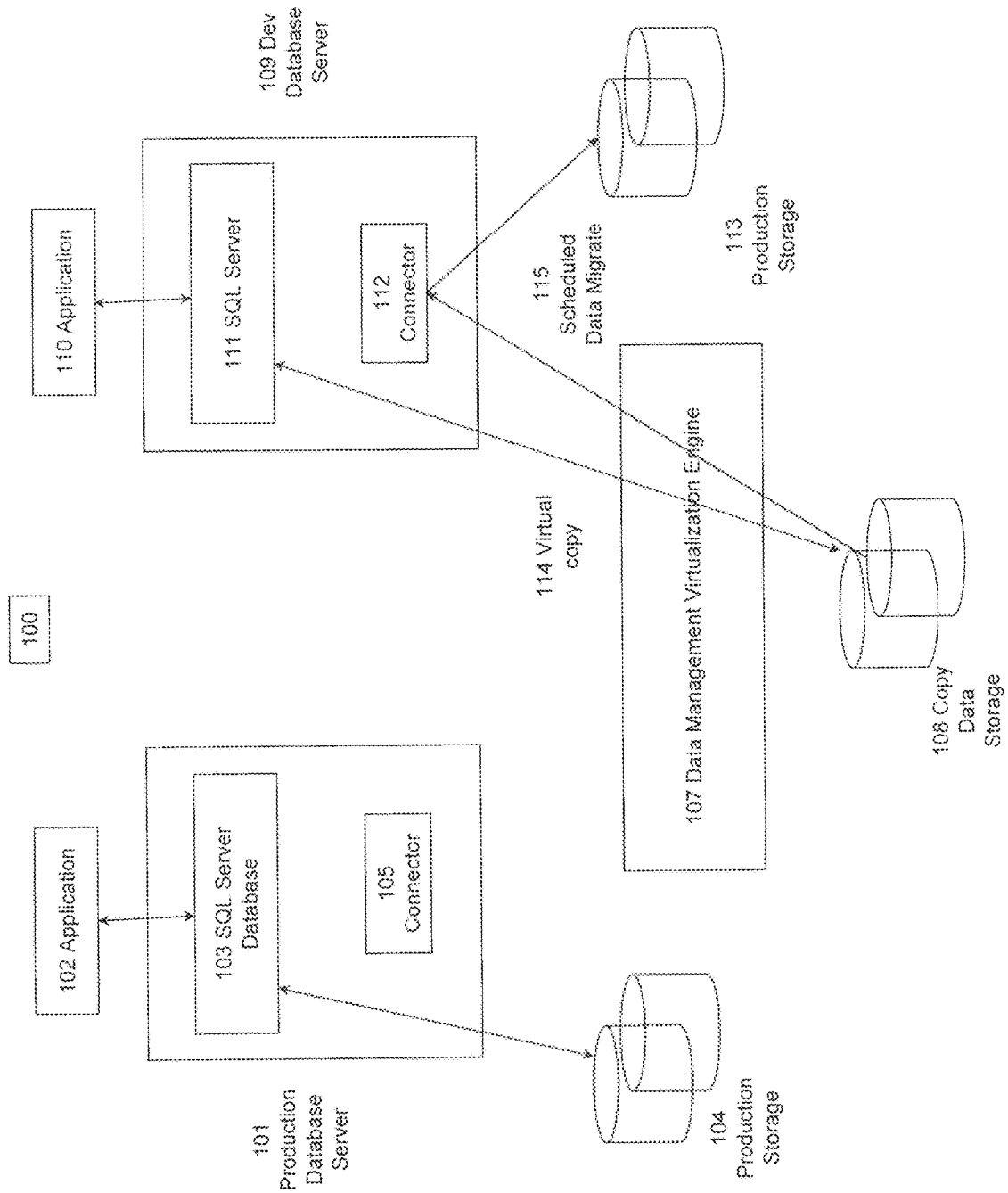

FIG. 1D illustrates an exemplary third step for migrating data according to certain embodiments. Data management virtualization engine 107 schedules and then performs a data migrate 115 of the data from copy data storage 108 to production storage 113 (for example as described with respect to FIG. 3). This is performed through connector 112. In certain embodiments, the data copy will be repeated on a frequency specified by the user. In certain embodiments, the copying is incremental-forever updates after the initial copy. In certain embodiments, the copying is a block level exact duplication of SQL server database 103 data files and does not require data formatting.

Figure 1E:
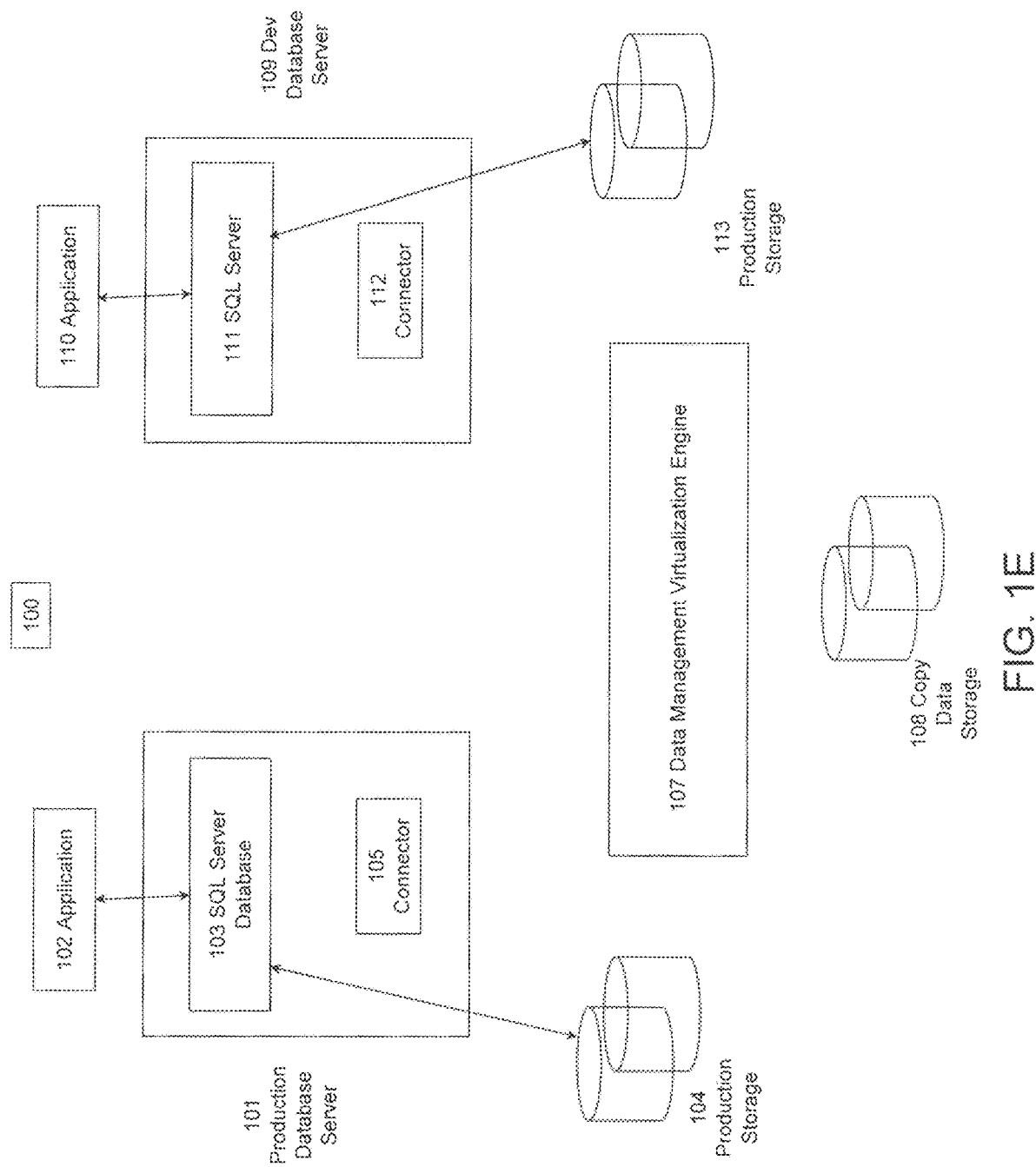

FIG. 1E illustrates an exemplary fourth step for migrating data according to certain embodiments. Once all data has been copied from copy data storage 108 to production storage 113 at least once, the user initiates a finalize step. In this step, the database copy 103 running on SQL Server 111 is taken offline and one final incremental migration is performed. Then the connector 112 instructs the SQL server 111 to switch to using data stored on production storage 113. In certain embodiments, the data presented from copy data storage 108 is removed from database server 109.

By performing the steps in FIGS. 1B-E, an SQL database can be migrated with earlier access to the migrated database. This early access to the database improves productivity. Without this capability, customers first wait for all of the data to be copied to the destination server and storage before they may begin accessing the database. In certain embodiments, the benefit is magnified proportionally to the size of the database as larger databases take longer to copy.

Figure 2:
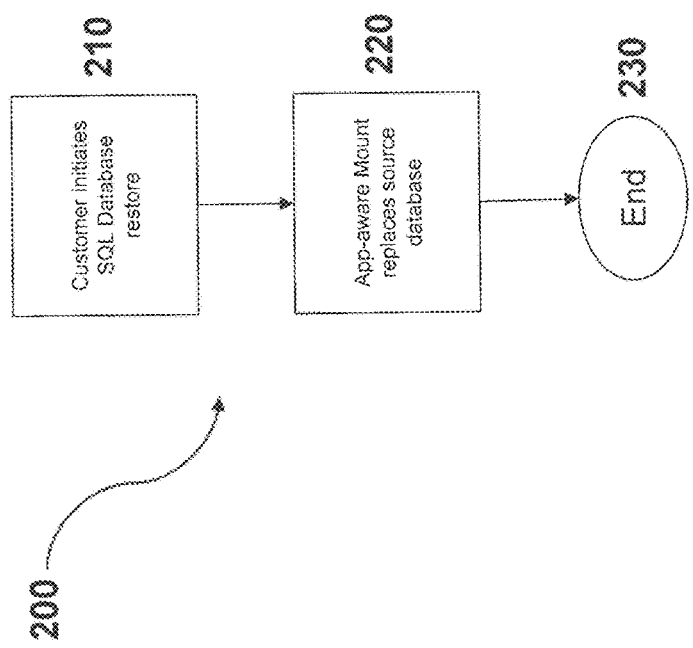
FIG. 2 illustrates a flowchart of a method of mounting a database for a restore according to certain embodiments.

FIG. 2 illustrates a flowchart of a method of restoring a database, according to certain embodiments. In certain embodiments, this is performed on the system 100 of FIG. 1. In step 210, the customer initiates the SQL database restore (e.g., of SQL server database 103). In step 220 the mount replaces the source database. In certain embodiments, the mount is an app-aware mount so that the data is more easily accessed by the particular application, for example, as an SQL database. In certain embodiments, step 220 is performed as described in FIG. 1C, discussed above. By replacing the database with the app-aware mount, the database can be brought online and used, without waiting for the data to be copied (restored) first.

Figure 3:
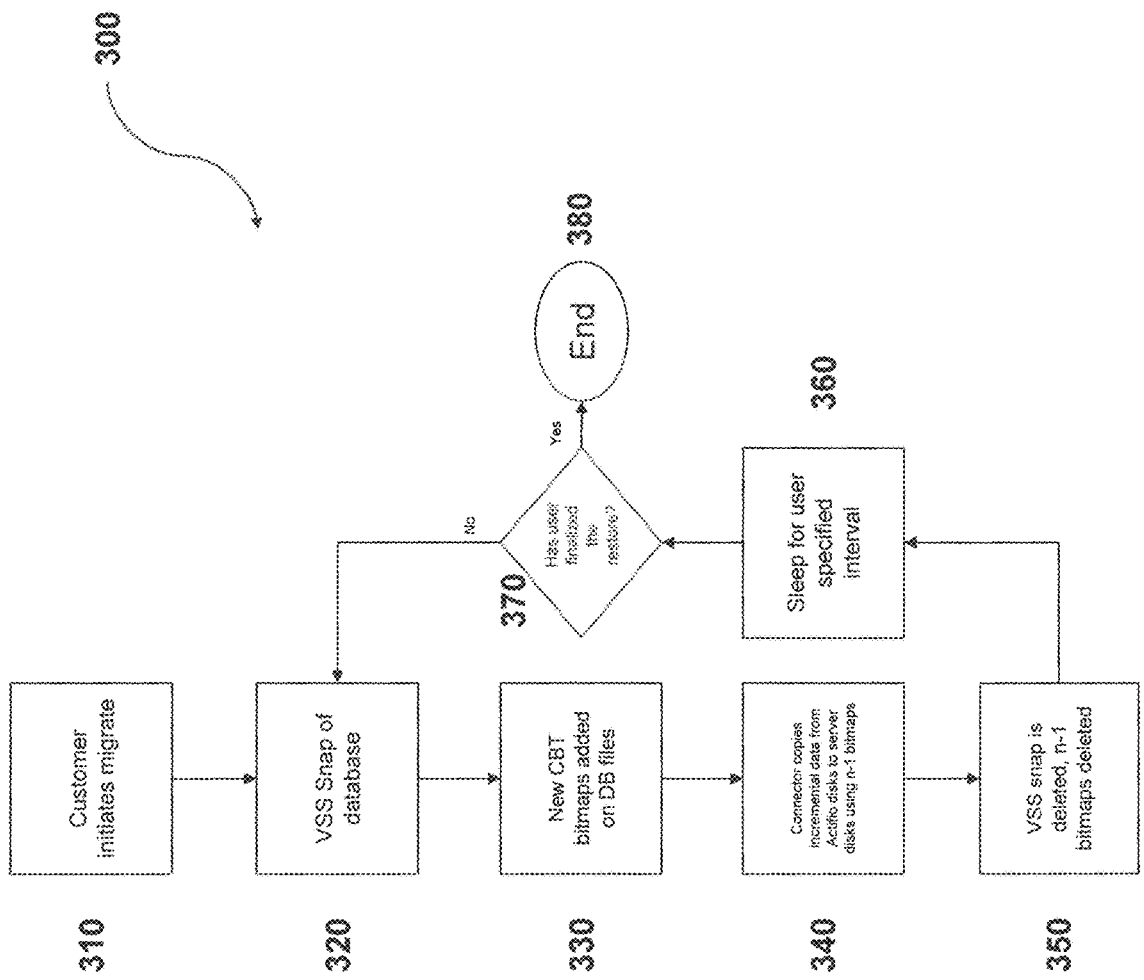
FIG. 3 illustrates a flow chart of steps to restore a database via migrate according to certain embodiments.
Figure 11:
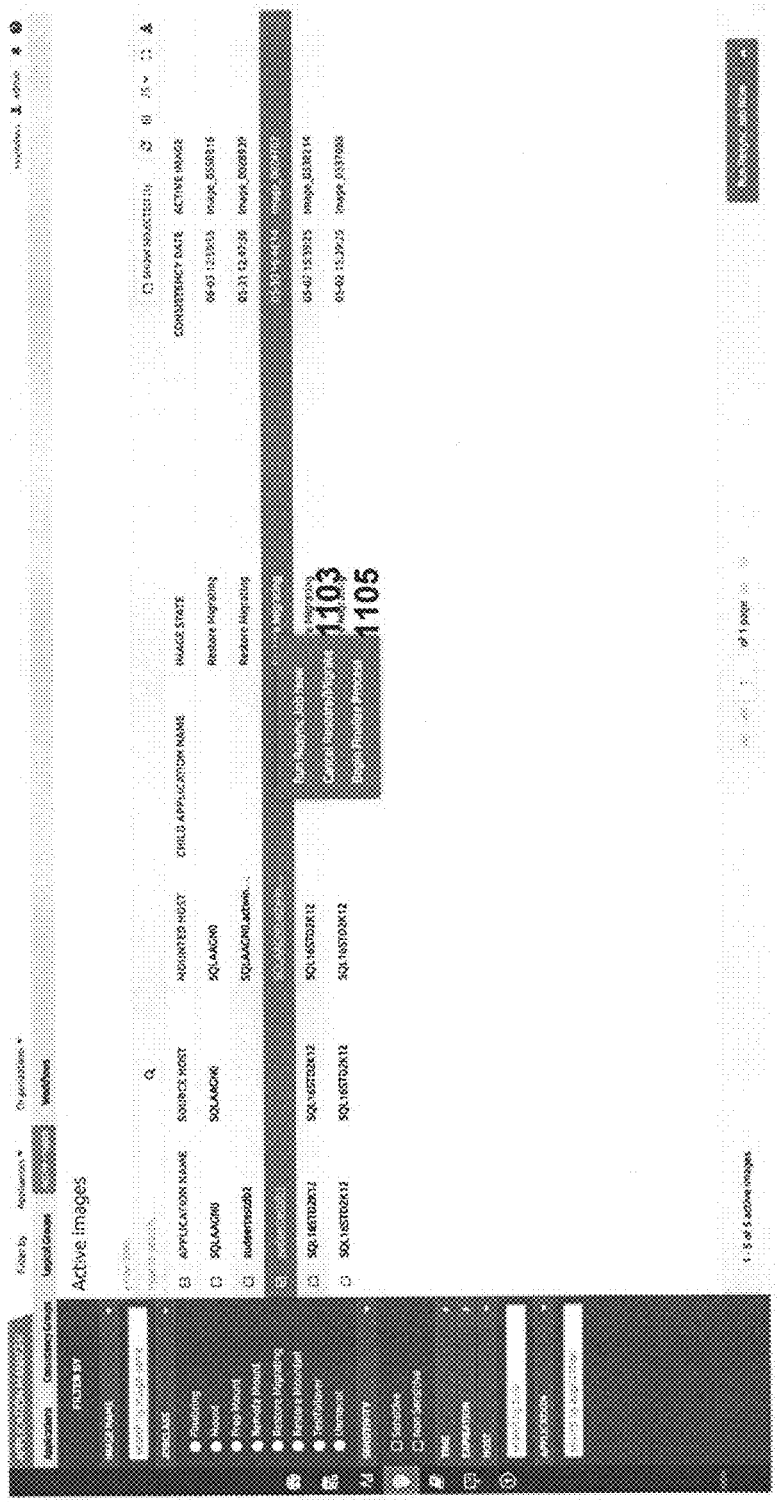
FIG. 11 illustrates a GUI for selecting to initiate finalization, or cancel migration, according to certain embodiments.

FIG. 3 illustrates a flowchart of a method of migrating a database, according to certain embodiments. For example, the method of FIG. 3 follows the method of FIG. 2. In certain embodiments, this is performed on the system 100 of FIG. 1. In step 310, the user initiates a migrate. For example, in certain embodiments, the migrate can be similar to that described in FIG. 1D. In step 320 the system takes a snapshot of the database to be migrated. In certain embodiments, the snapshot is a Microsoft Volume Shadow Copy Service ("VSS") snapshot, for example, to achieve data consistency. In step 330 the new change block tracking ("CBT") bitmaps are added on the database ("DB") files. The process for creating and storing bitmaps is described, for example, in U.S. Pat. No. 9,384,254, which his incorporated herein by reference. In step 340 the connector, (e.g., connector 112) copies incremental data from the storage, such as copy data storage 108 to the server disk using n−1 bitmaps, where "n" is the current migration job, and the n−1 bitmaps were created from step 330 of the previous migration job. If the migration job is the first migration job, then there are no bitmaps and the copy will copy all data, not just changes. In step 350 the VSS snapshot, for example on data management virtualization engine 107, that was created in step 320 is deleted, and the bitmaps from the previous iteration (if any) are deleted. In step 360 the system, such as data management virtualization engine 107, sleeps for, for example, a user specified interval. In certain embodiments, the interval is 1-24 hours. In certain embodiments, a scheduler can be implemented to schedule migration jobs. After the interval is complete, in step 370 the system determines whether the user has finalized the restore, in which case no additional migrations are needed. This is accomplished by determining whether the user has initiated the finalize process by clicking, for example, "Begin Finalize Process" as shown in FIG. 11. In certain embodiments, the finalize process becomes available to the user once the first migration job as completed successfully. The finalize process is used so that the copy that is on the production storage 113, which is not initially used, is used to run the database from that storage. Finalize will takes the DB offline to prevent any more changes, it will copy the changes to the production storage 113, then SQL server 111 is updated to run the database from production storage 113 instead of the mounted copy data storage 108. The DB is then brought online again. In certain embodiments, the user must initiate this process so that the user can determine when the DB goes offline, such as during a scheduled outage.

If the user has finalized the restore, the process ends in step 380. If the user has not finalized the restore, the process repeats steps 320-370 until it is determined that the user has finalized the migrate/restore in step 370. This permits the system to continue to capture changed data from the mounted database to migrate to the production storage.

FIG. 4 illustrates a flowchart of a method 400 of finalizing a restore or migrate, according to certain embodiments. For example, the method of FIG. 4 follows the method of FIG. 3. In certain embodiments, this is performed after step 350 in FIG. 3 has completed at least one time. In step 410 the customer initiates "finalize" for the restore, for example, after at least one migration job has completed successfully. In certain embodiments, this occurs during step 360 in FIG. 3. In step 420 the database is taken offline in order to finalize the restore or migrate. In step 430 the system performs a final refresh of the data on server disks using VSS and bitmaps, for example as described in steps 320-350 discussed above. This synchronizes the data with the latest version of the database. In step 440 the database is modified to use the data on production storage 113 rather than the copy data storage 108. In step 450 the database is brought online. In step 460 the system unmounts the storage from which the database had been running (e.g., copy data storage 108). In step 470 the process ends.

In certain embodiments, the system includes a transaction log for tracking transactions during the finalization process. For example, after a database is taken offline for a final refresh, the system can continue to handle transactions for the database and store them in a transaction log. After the final refresh, such as described herein, the database is brought back online and the transaction logs are used to re-sync the database with transactions that occurred while the database was offline. In certain embodiments, this is used on multi-node or distributed databases, such that only the specified node to be migrated or restored is taken offline and then re-synched with transactions that occurred while it was offline. In certain embodiments, this allows for further simplicity and automation, and allows for per-node granularity.

Examples of such a multi-node database include Microsoft SQL Server Availability Groups (AG). In certain embodiments, during the finalize stage, if the database is a member of an AG, it is not just taken offline, synchronized, switched to the new storage, and brought online. Instead, just on the specified node in the AG, the database is dropped from the AG, the final synchronization and switch to new storage is performed, and the database is re-joined to the AG on that node. SQL re-syncs the database on the node with transaction logs for any transactions that took place during this process.

FIG. 5 illustrates exemplary API parameter options to select the destination for the migrate of a database according to certain embodiments. 510 illustrates the option to specify the migrate should copy the files to the same location as the production database. For example, for the option "restore-location", the user specifies usesourcelocation="true" to indicate that the data should be migrated to the same location as the source location. 520 illustrates the option to specify the migrate should copy the files with different target file location for each production database file. For example, for the option "restore-location", the user specifies usesourcelocation="false" to indicate that the data should be migrated to a different location as the source location. The user also specifies the "file" option for each file, and provides the file name, source and target location for each. The 530 illustrates the option to specify the migrate should copy the files to a different target volume, while keeping files that were on the same production volume together on the new target volume. Similar to command 520, for the option "restore-location", the user specifies usesourcelocation="false" to indicate that the data should be migrated to a different location as the source location. The user also specifies the "volume" option for each production volume and provides the source and target location for each.

Figure 6:
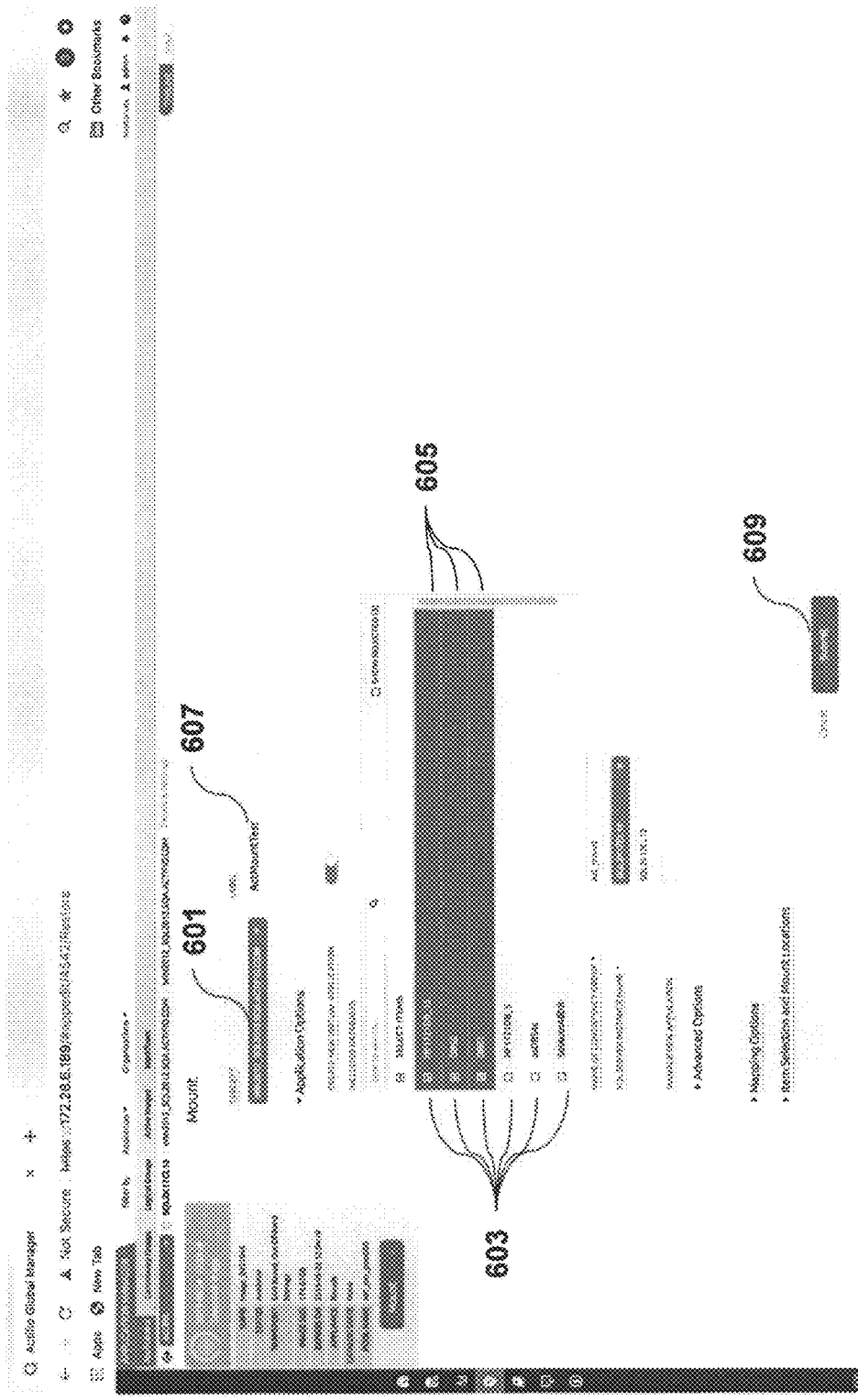
FIG. 6 illustrates a GUI for initiating a mount, according to certain embodiments.

FIGS. 6-11 illustrate a GUI and process for migrating a database according to certain embodiments. FIG. 6 illustrates a GUI for initiating a mount, according to certain embodiments, for example after selecting to migrate a database. In certain embodiments, if the user instead selects to restore a database, the same GUI can be used except that the user does not select a target and the system does not display the target. A user selects a target 601 that as the mount destination. From the list 603 of available databases, the user selects one or more databases 605 to migrate (e.g., SQL server database 103). In certain embodiments, the user selects a label 607 for the migrate. By selecting submit 609, the user initiates a mount, such as discussed with respect to FIGS. 1 and 2. In certain embodiments, once submit 609 is selected, the system mounts the new database to the SQL Server (e.g., SQL server 111) on the selected target server (e.g., Dev Database Server 109) so that the new database can begin running off of the copied data (e.g., copy data storage 108).

Figure 7:
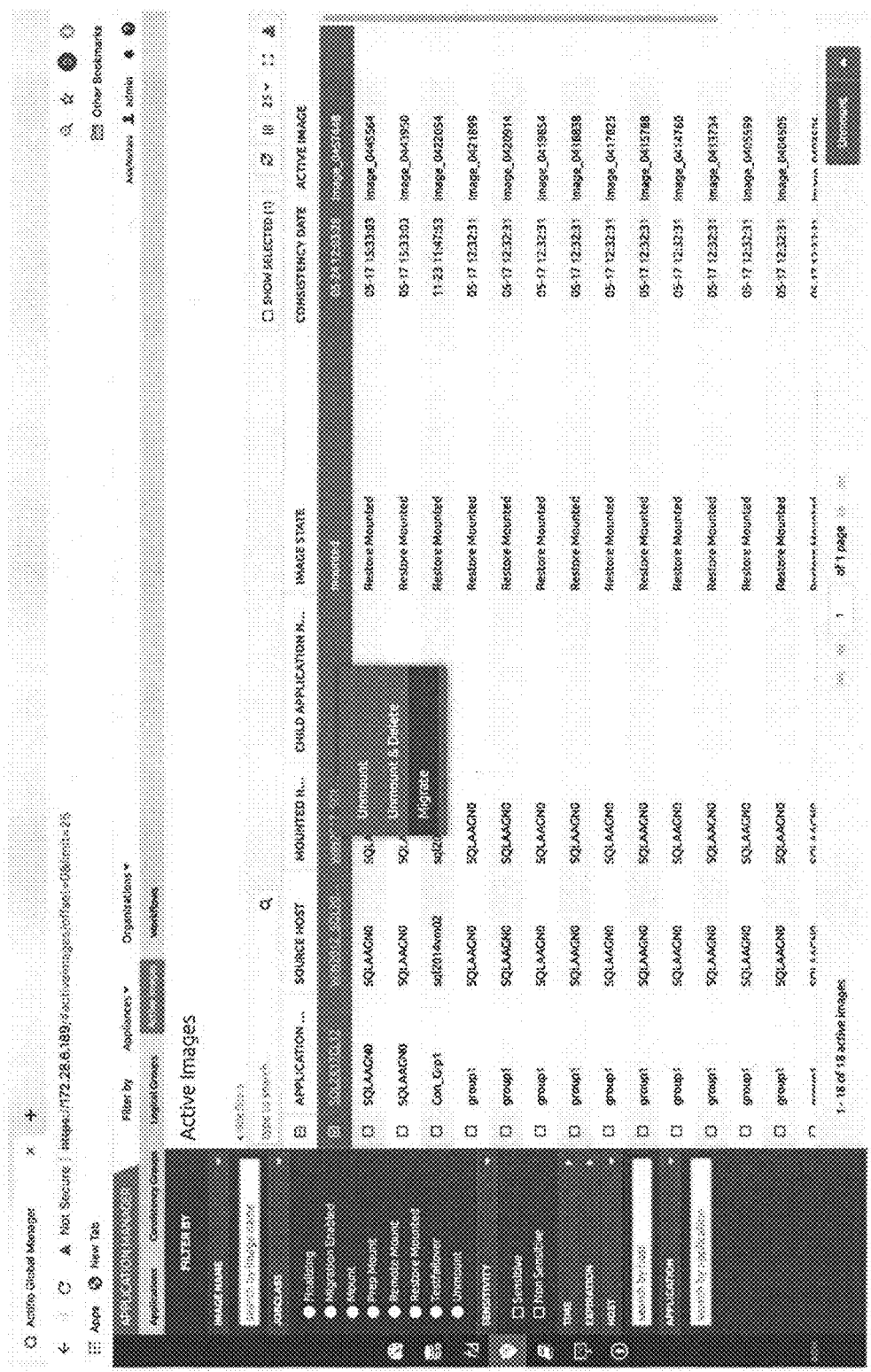
FIG. 7 illustrates a GUI for selecting to initiate a migrate, according to certain embodiments.

FIG. 7 illustrates a GUI where the user can choose to initiate a migrate, according to certain embodiments. For example, the system can display active images that that have been initiated, for example, as shown in FIG. 6. The system displays a list containing each active image and includes enough information for the user to identify the one they want. In certain embodiments, this can include the application, source host, image state, and/or active image. For example, for a migrate, the image state can be mounted, indicating, like in FIG. 1C, that a database has been mounted for use on the new database server (e.g., SQL server 111), migrating, indicating that the data is in a process of migrating as described herein, or finalizing, indicating that the process is in the finalization step as described herein. For a restore with mount and migrate, the image states can be the same but indicate that they are part of a restore. The user can select an active image and choose to migrate the image. If a migrate is selected, for example, the system begins a process of migrating such as shown in FIG. 1D and FIG. 3.

Figure 8:
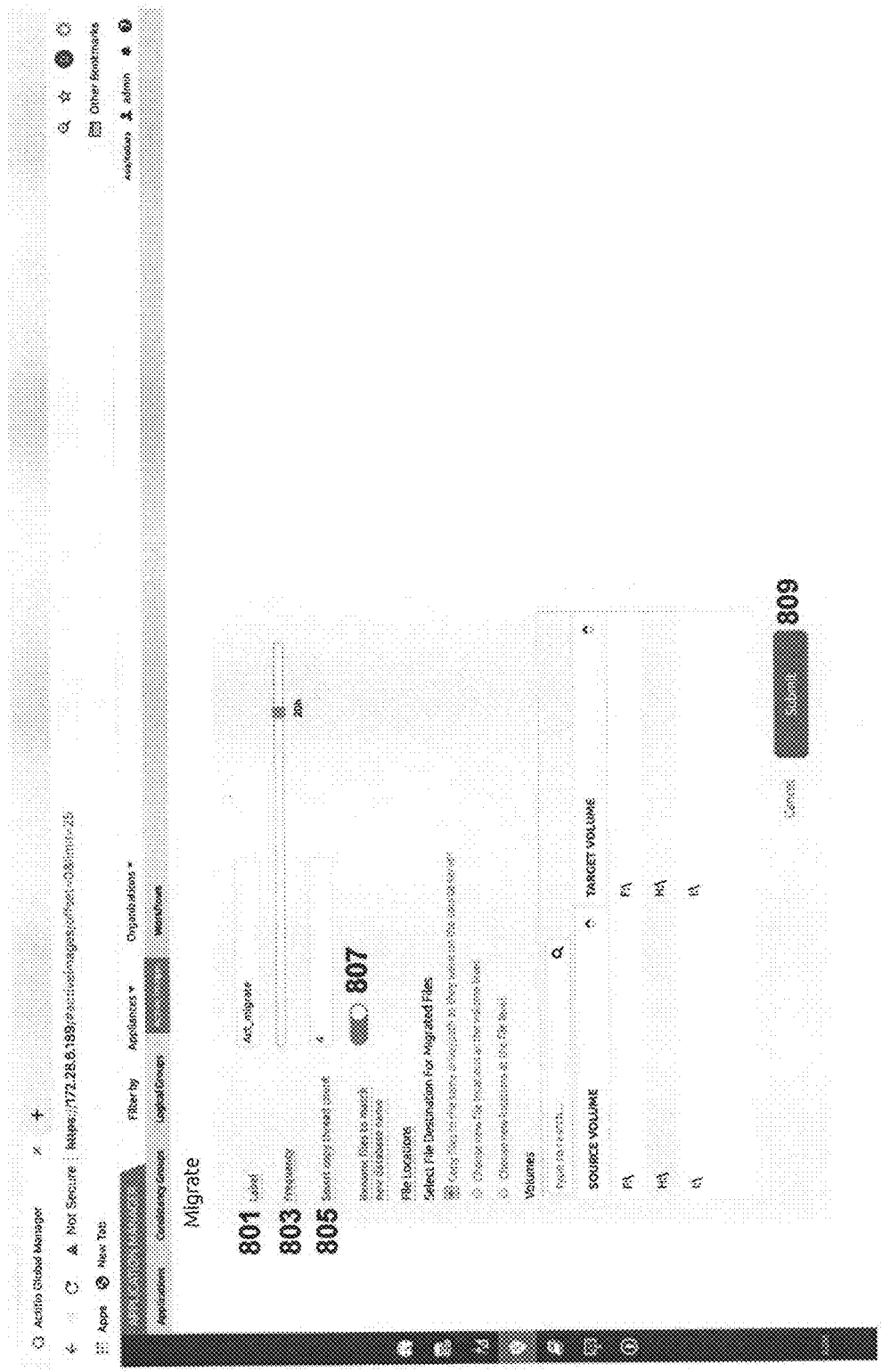
FIG. 8 illustrates a GUI for initiating a migrate with the original file locations preserved, according to certain embodiments.
Figure 9:
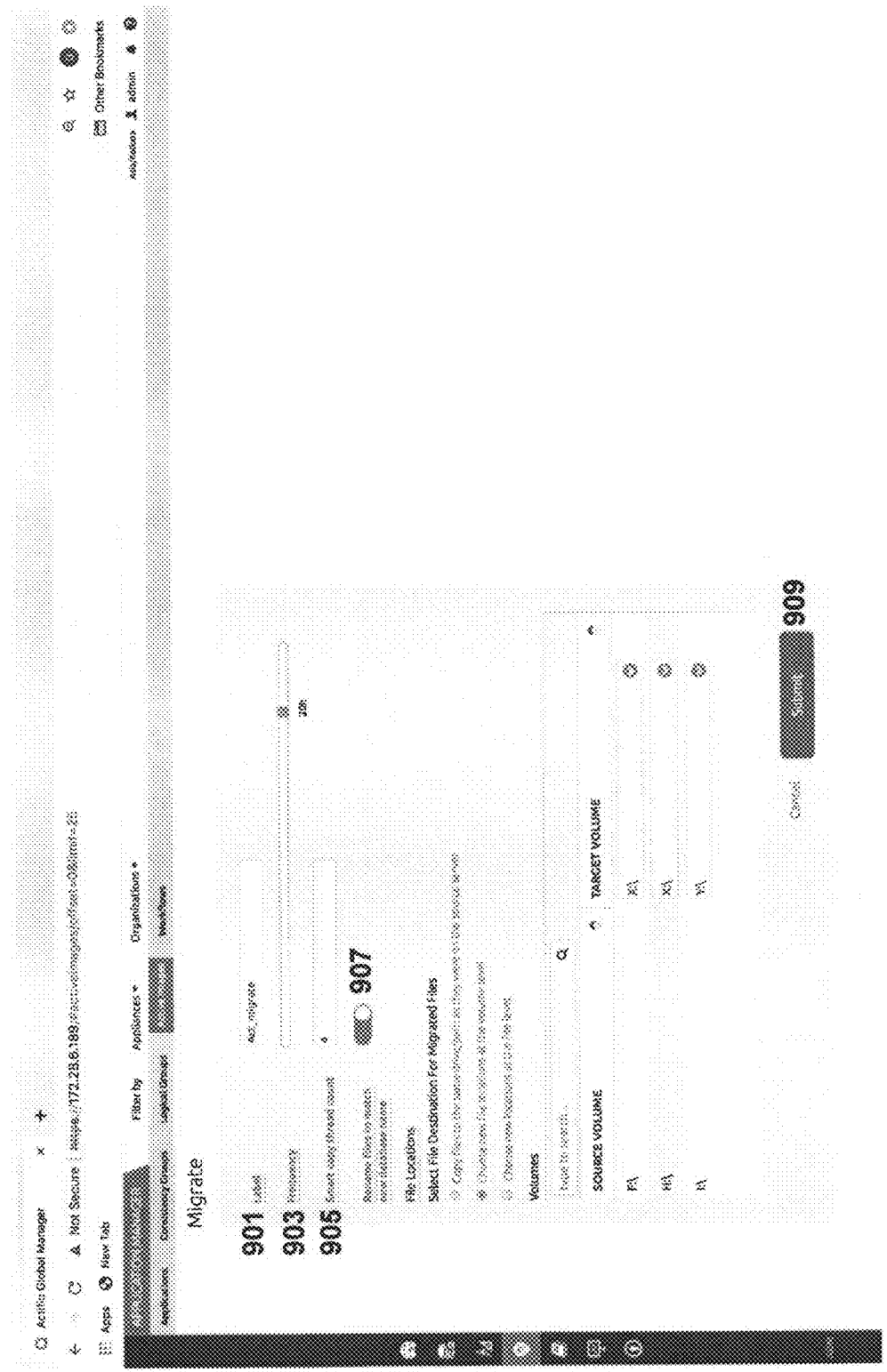
FIG. 9 illustrates a GUI for initiating a migrate with new file locations selected by volume, according to certain embodiments.
Figure 10:
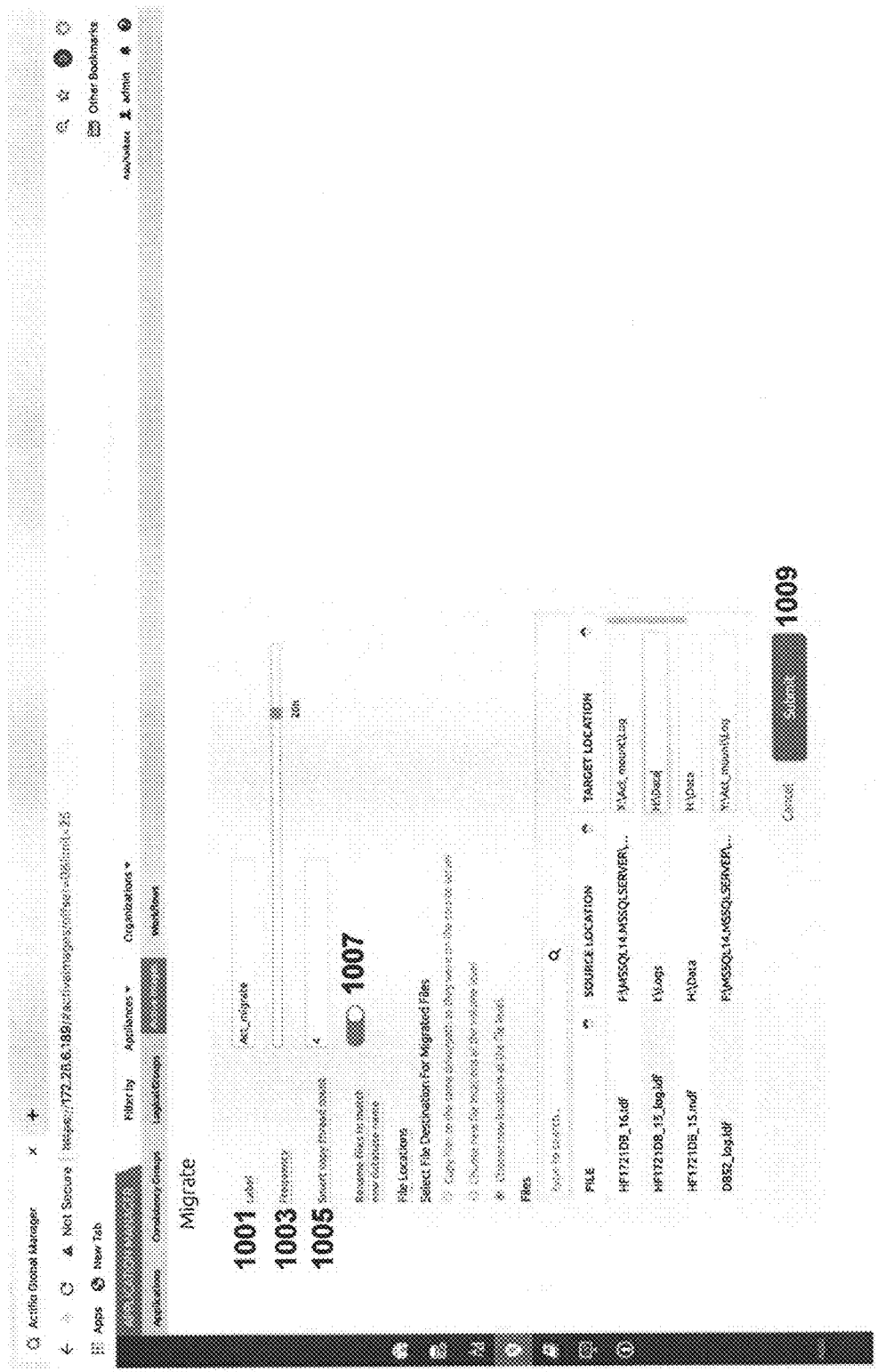
FIG. 10 illustrates a GUI for initiating a migrate with new file locations selected by file, according to certain embodiments.

In certain embodiments, after the user initiates a migration, they are asked to specify a label 801/901/1001, frequency 803/903/1003, and smart copy thread count 805/905/1005 for the migrate. If the active image selected was created by a mount (and not a restore mount), then the user also is allowed to specify the location to which the database will be migrated, such as shown in FIGS. 8-10, and can choose if database files should be renamed while being migrated 807/907/1007. For example, a user enters a label so that migration jobs linked to this request can easily be identified and reported on later. The user selects the frequency to determine how often migration jobs should run (FIG. 3, item 360). The user may enter the smart copy thread count to control the performance of the copy process, and the user may select if database files should be renamed so that renamed databases can continue to match the underlying files for the database. The user can also select a destination for the migrated files on the new server, i.e., to where the files should be copied. For example, in certain embodiments, the location is the same drive/path as they were on the source server, as shown in FIG. 8. In other embodiments, the location is a new location at the volume level, as shown in FIG. 9. If this is selected, the user specifies a target volume path name for each source volume being migrated. In other embodiments, the location is a new location at the file level, as shown in FIG. 10. If this is selected, the user specifies a target location path name for each source file to be migrated. The migrate request is completed, for example, by selecting submit 809/909/1009. In certain embodiments, this begins a migration to the new location, such as is shown in FIG. 1D and FIG. 3.

FIG. 11 illustrates a GUI for finalizing a migrate, according to certain embodiments. In certain embodiments, this is similar to the GUI shown in FIG. 7. In certain embodiments, once data has been migrated, the image state changes to migrating or restore migrating. For a given active image, a migrate or restore is canceled by selecting cancel restore/migrate 1103. In addition, a migrate or restore is finalized by selecting begin finalize process 1105. In certain embodiments, this begins the process described, for example, in FIG. 1E and FIG. 4. In certain embodiments, an option ("run resync job now") is included to run a migration job without waiting for the next scheduled job. For example, the system performs step 360 in FIG. 3.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file.

A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The invention claimed is:

1. A computerized method of migrating or restoring a server database such that the migrated server database can be used before data has copied to storage for the migrated server database, the method comprising:
   in response to a user initiating a migration of a server database, storing a copy of data used by the server database in a copy storage, the copy storage being different storage than a first storage used by the server database;
   mounting the copy of data in the copy storage to a second server database such that the second server database can use the copy of data on the copy storage;
   bringing the second server database online, the second server database using the copy of data on the copy storage;
   copying the copy of data to a second storage;
   after copying the copy of data to the second storage, determining a change in the copy of data at the copy storage, the change made by the second server database;
   updating the copy of data stored at the second storage with the determined change;
   after updating the copy of data stored at the second storage, determining whether the user has initiated finalization of the migration of the server database;
   when the user has not initiated finalization, updating the copy of data stored at the second storage with any second determined change in the copy of data made by the second server database; and
   when the user has initiated finalization, finalizing migration to the second server database, the finalization comprising:
      switching the second server database to use the second storage; and
      unmounting the copy of data in the copy storage, thereby permitting use of the second server database before copying the copy of data to the second storage.

2. The method of claim 1, wherein the second server database is the same as the server database.

3. The method of claim 2, wherein the second storage used by the second server database is the same as the first storage used by the server database.

4. The method of claim 2, wherein the second storage used by the second server database is different than the first storage used by the server database.

5. The method of claim 1, wherein the second server database is different from the server database.

6. The method of claim 5, wherein the second storage used by the second server database is the same as the first storage used by the server database.

7. The method of claim 5, wherein the second storage used by the second server database is different than the first storage used by the server database.

8. The method of claim 1, wherein switching the second server database to use the second storage comprises:
   bringing the second server database offline;
   refreshing the data on the second storage for use by the second server database;
   modifying the second server database to use data in the second storage; and
   bringing the second server database online.

9. The method of claim 8, further comprising maintaining a transaction log including information representative of transactions on the server database, and
   wherein after one of the refreshing the data on the storage for use by the server database, the modifying the second server database to use data in the second storage, or the bringing the second server database online, the second server database is updated based on the transaction log.

10. A system for migrating or restoring a server database such that the migrated server database can be used before data has copied to storage for the migrated server database, the system comprising:
   a processor;
   a memory coupled to the processor and including instructions that, when executed by the processor, cause the processor to:
      in response to a user imitating migration of a server database, store a copy of data used by the server database in a copy storage, the copy storage being different storage than a first storage used by the server database;
      mount the copy of data in the copy storage to a second server database such that the second server database can use the copy of data on the copy storage;
      bring the second server database online, the second server database using the copy of data on the copy storage;
      copy the copy of data to a second storage;
      after copying the copy of data to the second storage, determine a change in the copy of data at the copy storage, the change made by the second server database;
      update the copy of data stored at the second storage with the determined change;
      after updating the copy of data stored at the second storage, determine whether the user has initiated finalization of the migration of the server database;
      when the user has not initiated finalization, update the copy of data stored at the second storage with any second determined change in the copy of data made by the second server database; and
      when the user has initiated finalization, finalize migration to the second server database, the finalization comprising:
         switching the second server database to use the second storage;
         and
         unmounting the copy of data in the copy storage, thereby permitting use of the second server database before copying the copy of data to the second storage.

11. The system of claim 10, wherein the second server database is the same as the server database.

12. The system of claim 11, wherein the second storage used by the second server database is the same as the first storage used by the server database.

13. The system of claim 11, wherein the second storage used by the second server database is different than the first storage used by the server database.

14. The system of claim 10, wherein the second server database is different from the server database.

15. The system of claim 14, wherein the second storage used by the second server database is the same as the first storage used by the server database.

16. The system of claim 14, wherein the second storage used by the second server database is different than the first storage used by the server database.

17. The system of claim 10, wherein switch the second server database to use the second storage comprises instructions that, when executed by the processor, cause the processor to:
bring the second server database offline;
refresh the data on the second storage for use by the second server database;
modify the second server database to use data in the second storage; and
bring the second server database online.

18. The system of claim 17, further comprising transaction log including information representative of transactions on the server database; and
further comprising instructions that, when executed by the processor, cause the processor to updated the second server database based on the transaction log after one of refresh the data on the storage for use by the server database, modify the second server database to use data in the second storage, or bring the second server database online.

19. A non-transitory computer readable medium having executable instructions operable to cause an apparatus to:
store a copy of data used by a server database in a copy storage, the copy storage being different storage than a first storage used by the server database;
mount the copy of data in the copy storage to a second server database such that the second server database can use the copy of data on the copy storage;
bring the second server database online, the second server database using the copy of data on the copy storage;
copy the copy of data to a second storage;
after copying the copy of data to the second storage, determine a change in the copy of data at the copy storage, the change made by the second server database;
update the copy of data stored at the second storage with the determined change;
after updating the copy of data stored at the second storage, determine whether a user has initialed finalization;
when the user has not initiated finalization, update the copy of data stored at the second storage with any second determined change in the copy of data made by the second server database; and
when the user has initiated finalization, finalize migration to the second server database, comprising:
switching the second server database to use the second storage; and
unmounting the copy of data in the copy storage, thereby permitting use of the second server database before copying the copy of data to the second storage.

20. The non-transitory computer readable medium of claim 19, wherein switch the second server database to use the second storage comprises executable instructions operable to cause an apparatus to:
bring the second server database offline;
refresh the data on the second storage for use by the second server database;
modify the second server database to use data in the second storage; and
bring the second server database online.

* * * * *